United States Patent

Osborne et al.

[15] 3,662,269

[45] May 9, 1972

[54] REMOTE DRIFT RATE COMPENSATOR FOR FREQUENCY STANDARDS

[72] Inventors: Eugene F. Osborne, Baltimore; Lauren J. Rueger, Silver Spring, both of Md.

[73] Assignee: The United States of America as represented by the Secretary of the Navy

[22] Filed: Apr. 28, 1969

[21] Appl. No.: 819,596

[52] U.S. Cl. ....................325/63, 325/184, 331/35, 331/175

[51] Int. Cl. ....................H04b 1/66, H03b 3/04

[58] Field of Search ....................325/63, 184, 17; 331/13, 24, 331/35, 175; 317/249, 250; 334/84; 74/665 GA, 714

[56] References Cited

UNITED STATES PATENTS

| | | | |
|---|---|---|---|
| 2,658,146 | 11/1953 | Jackson | 331/13 |
| 3,488,605 | 1/1970 | Schwartz | 331/175 |
| 3,560,880 | 2/1971 | Easton et al. | 331/175 |
| 3,569,613 | 3/1971 | Kresock | 178/5.4 SY |

*Primary Examiner*—Robert L. Griffin
*Assistant Examiner*—John C. Martin
*Attorney*—J. A. Cooke and R. J. Erickson

[57] ABSTRACT

A drift rate compensator for secondary frequency standards of the quartz crystal type, which provides adjustment by remote control for long term rate of frequency change. Invention is particularly useful for maintaining the frequency stability of the oscillator in an orbiting satellite.

2 Claims, 8 Drawing Figures

INVENTORS
EUGENE F. OSBORNE
LAUREN J. RUEGER

BY J. O. Tresansky
ATTORNEY

INVENTORS
EUGENE F. OSBORNE
LAUREN J. RUEGER

INVENTORS
EUGENE F. OSBORNE
LAUREN J. RUEGER

INVENTORS
EUGENE F. OSBORNE
LAUREN J. RUEGER

REMOTE DRIFT RATE COMPENSATOR FOR FREQUENCY STANDARDS

BACKGROUND AND OBJECTS

In systems using secondary frequency standards, typically of the quartz crystal type, it is desired to construct and apply compensation for the long term aging characteristics of the crystals and thereby obtain more accurate references. A continuous or quasi-continuous compensation is desired which will adjust and correct for the long term rate of change of the frequency of oscillation caused by crystal aging and other variables. For manned equipment, compensation may, of course, be easily made by attending operators. For unmanned equipment, however, such as an orbiting satellite, compensation must be made by remote control, as by radio telemetry, and must continue automatically in the intervals between satellite input commands.

For early satellites the initial offset error was specified to be within ±3 parts in $10^6$ while the total drift over 5 years life was to have been within 2 parts in $10^6$ from the initial frequency. This would correspond to a drift rate of 1.1 parts in $10^9$ per day average, assuming a constant drift rate.

In cases where no means are employed to compensate for satellite oscillator frequency drift, it is necessary to (1) transmit carrier (frequency) and modulation (timing) signals which are noncoherent, the timing being generated from the oscillator but modified by programs from a memory register, as commanded by ground station injection, (2) transmit modulation (code words) giving the magnitude of the oscillator frequency error, and (3) receive, decode, and compute, using a 3×3 matrix or the equivalent, to obtain a navigation fix of the required accuracy.

One technique used has been stepped frequency compensation, where periodic corrections must be made over the lifetime of the oscillator if the drift error is to be maintained within acceptable tolerances. This technique, however, requires a large number of selectable timing positions for, say, a 5 year oscillator lifetime.

The principal object of the present invention, therefore, is to provide a drift rate compensator by the use of which timing may be derived directly or coherently from a satellite frequency standard, so that a navigator, using the satellite for navigation purposes, will require less data and may use simpler fix computation routines.

Another object of the invention resides in the provision of a drift rate compensator which will maintain oscillator stability of a high order.

The invention provides as a further object a drift rate compensator which will require but few input compensation rate commands over long periods of time to maintain the stability of a satellite oscillator within acceptable tolerances.

Other objects of the invention will become evident as the description thereof proceeds.

DESCRIPTION

Figure 1:
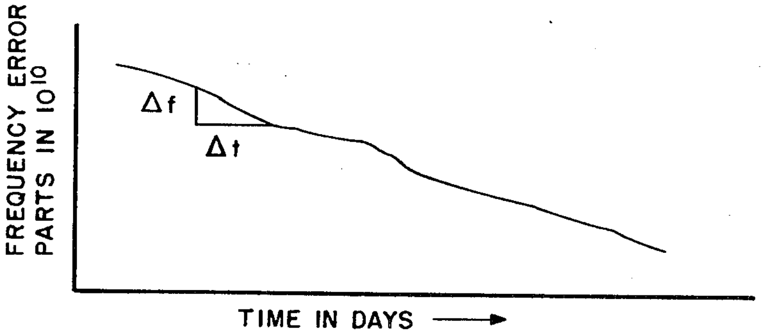
FIG. 1 is a chart showing the aging characteristics of a crystal.

Quartz crystals of the type used in secondary frequency standards vary in frequency over long periods of time, due to their aging characteristics, as shown in the chart comprising FIG. 1. As it is essential that oscillator frequency stability be maintained as nearly constant as possible, when a frequency standard is used in a navigation satellite, to obtain an accurate navigation fix, some means is necessary to compensate for frequency changes.

Figure 2:
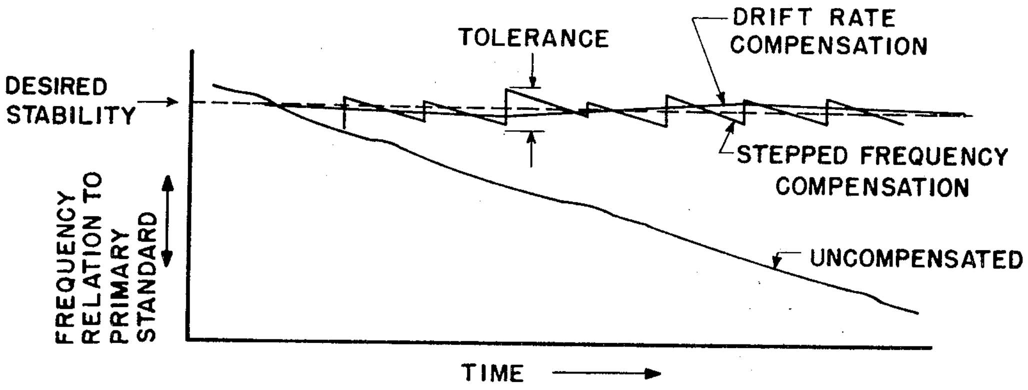
FIG. 2 is a chart showing, by way of comparison, the frequency drift of an oscillator crystal relative to a primary standard over a given time period under the conditions of no compensation, stepped frequency compensation, and drift rate compensation according to the present invention.

The chart in FIG. 2 shows two methods of compensation for oscillator frequency drift and compares them with a curve showing uncompensated drift. The stepped frequency method, which is prior art, requires periodic corrections over the lifetime of the crystal unit if the error is to be maintained within tolerances. As will be seen, a large number of corrections will have to be made over, say, a 5 year lifetime. For example, in one prior art frequency compensation method, a total of 27,000 steps would have to be made over the full tuning range.

In contrast to the stepped frequency compensation method mentioned above, the drift rate compensator constituting the present invention requires relatively few and infrequent input commands. In fact, if the drift rate is well known, the total number of selectable compensation rates required to maintain the oscillator frequency within satisfactory tolerance can be quite small, i.e., in the order of 10 to 20. Since the long term drift rate of quartz crystals has been shown to be quite uniform, once the compensation approaches the actual drift rate, long periods of time may expire before a new command need be inserted to change the compensation.

For secondary frequency standards incorporating single oscillators, the best known tuning methods utilize variable capacitors. Mechanically and electrically tuned capacitors are possible; however, the mechanical type is preferred for its fail-safe feature and short term stability. Three forms of such mechanically tuned capacitors will be described hereinafter.

In the mechanization of the mechanically tuned capacitor compensation system several implementation techniques are open to the designer, e.g., a single variable speed motor with a speed reducer, a single incremental variable rate stepping actuator, differential variable speed control with two motors, or the use of velocity servos or rate feedback control systems. The practicality of these various approaches are suspect until numerical calculations are performed with required life and resolution and tolerance parameters. Assuming that a single tuning capacitor is to be used for compensation over a 5 year period and that a 100 percent excess tuning range is desired for design purposes, the system resolution required will be:

a. For evidence of compensation in any one second interval:

$$R_s=\frac{1}{2\times5\times365\times24\times60\times60}=3.2\times10^{-9}\ \mathrm{sec}^{-1}$$

b. For evidence of compensation in any one minute interval:

$$R_s=\frac{1}{2\times5\times365\times24\times60}=1.93\times10^{-7}\ \mathrm{min}^{-1}$$

The above calculations suggest that an input actuator providing one unit of motion per second or per minute would require a mechanical attenuation, e.g., a gear reduction, of $1/R_s$ or $3.13\times10^8$ and $4.2\times10^6$ for (a) and (b) above, respectively. Additional reduction would be required to permit electric motors to operate at practical speeds, typically around 1,000 rpm. Thus, a single motor running at 1,000 rpm with a gear reduction of $5.2\times10^8$ should adjust a tuning capacitor through one-half its total range in 5 years, assuming a one revolution capacitor.

Figure 3:
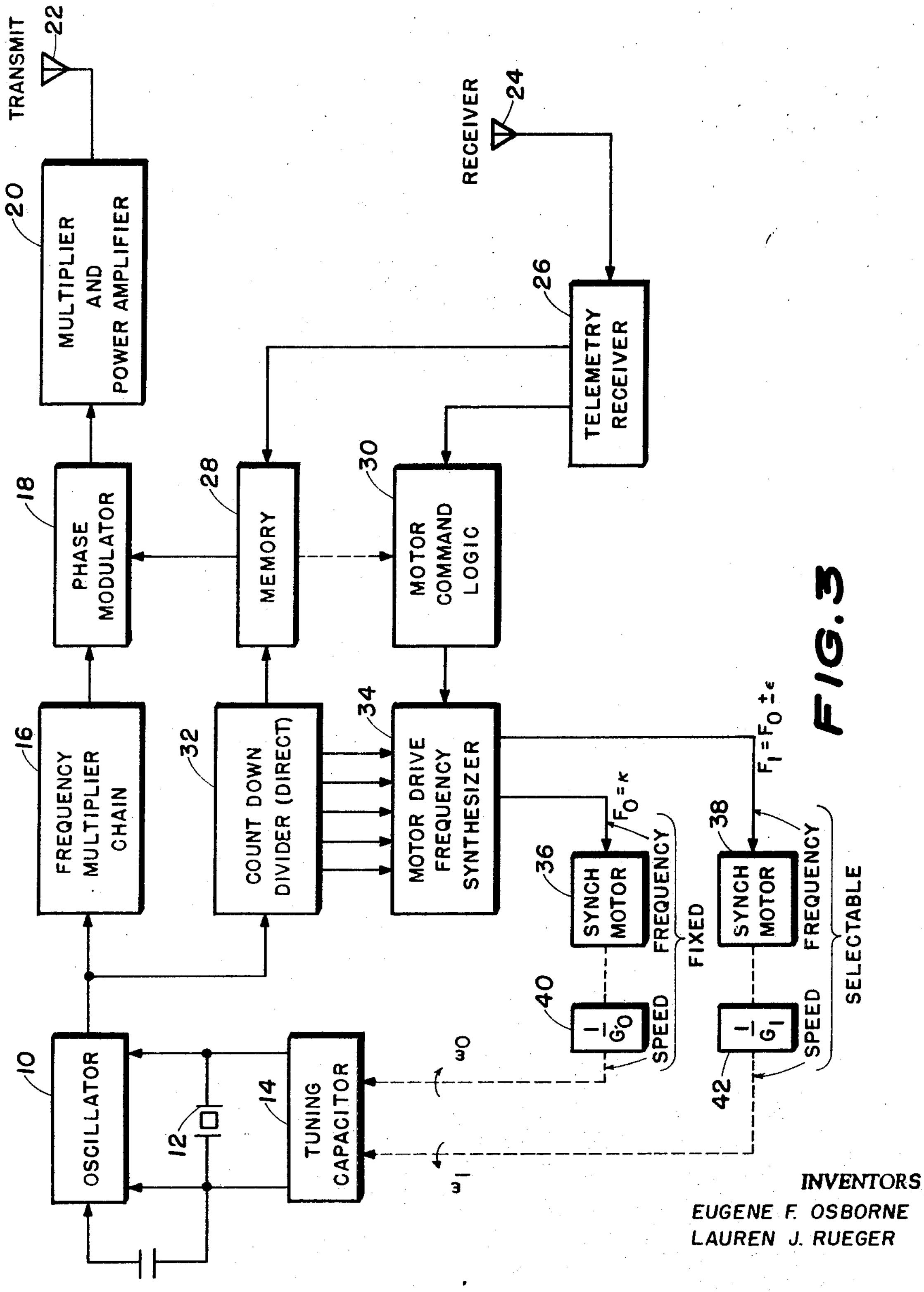
FIG. 3 is a block diagram showing the connection of the major components of a satellite having a differential drift rate compensated oscillator.

Since the construction of gear reducers of instrument quality in ratios greater than about $10^4$ is a formidable task, if low losses, small size and weight, and low cost are to be achieved, it is desirable to transfer a part of the problem to electronics, using a form of differential capacitor tuning, as shown in FIG. 3.

Referring specifically to FIG. 3, a satellite transmitting and receiving system is shown in block diagram. In this view the oscillator is shown at 10, the control crystal at 12 and the tuning capacitor for the oscillator at 14. In the transmitter section the oscillator 10 is connected through a frequency multiplier 16, a phase modulator 18, and multiplier and power amplifier 20 to a transmitting antenna 22.

The receiver section includes an antenna 24 and a receiver 26. The output of the receiver is connected to a memory unit 28 and to a motor command logic unit 30. The oscillator 10 is utilized in the receiver section and is connected to a frequency divider (count down) unit 32 which is connected to the memory unit 28 and to a motor drive frequency synthesizer unit 34. The memory unit 28, which functions to change the rate of compensation between satellite message injection periods, is also connected to the motor command logic unit 30.

Differential control of the tuning capacitor is effected by synchronous motors 36 and 38 which are connected to the frequency synthesizer unit 34 and which have gear reduction units 40 and 42, respectively, associated therewith. The mechanical connections between the motors and their respective gear reduction units and between said gear reduction units and the capacitor 14 are shown in broken lines.

The basic concept shown in FIG. 3 compensates for the long term frequency drift and maintains the oscillator output oscillation at 5 $MH_z$ minus the desired offset (80 parts per million). The frequency of oscillation is proportional to the value of the total capacitance $D_{(t)}$ which is made to vary with time according to the drift rate observed by fixed satellite injection ground stations using primary frequency standards. The injection ground station selects the magnitude of the rate compensation by radio telemetry (when the satellite is in radio view of the injection station). The magnitude of the compensation can be updated whenever the satellite again comes within radio view of the injection.

In the present invention, as shown in FIG. 3, the tuning capacitor is differentially driven by two electromechanical actuators, one operating to increase the value of capacitance, and the second operating to decrease the value of capacitance. Since the two mechanical rates can be made or controlled to be nearly equal, the tuning range of the capacitor can be spread over an exceedingly long interval, say 5 years.

The method of mechanical speed control proposed uses frequency as the control parameter since it is available with exceptional accuracy. The tuning rate (mechanical) will be constant between injection periods without recourse to local feedback control methods by virtue of synchronous motor drives and the use of synthesized drive frequencies derived from the oscillator itself. The fixed speed channel (synchronous motor and gear reducer) is always driven at the same frequency $f_o$ derived by direct counting down from the oscillator at $5(1 - 80 \times 10^{-6})$ $MH_z$. The variable speed channel is driven at constant discrete rates (which are selectable by command logic and telemetry) which are determined by synthesized unique values of $f_i = f_o \pm \epsilon$. It should be noted that, since the long term drift is unidirectional as in FIG. 1, $f_i$ may always be made either greater or less than $f_o$.

In terms of rotary motion the equivalent input angular rotation to the tuning capacitor is $$\theta(t) = \int_0^T (w_1 - w_0)\,dt$$

which can be related to the oscillator and synthesized frequencies by $$\theta(t) = \frac{120 \times 360}{G \times \text{number poles}} \int_0^T (f_1 - f_0)\,dt \text{ (degrees)}$$

when the gear ratio ($G$) and the number of poles of both of the synchronous drives are assumed equal; $f$ is in $H_z$ and $T$ is in minutes.

Figure 4:
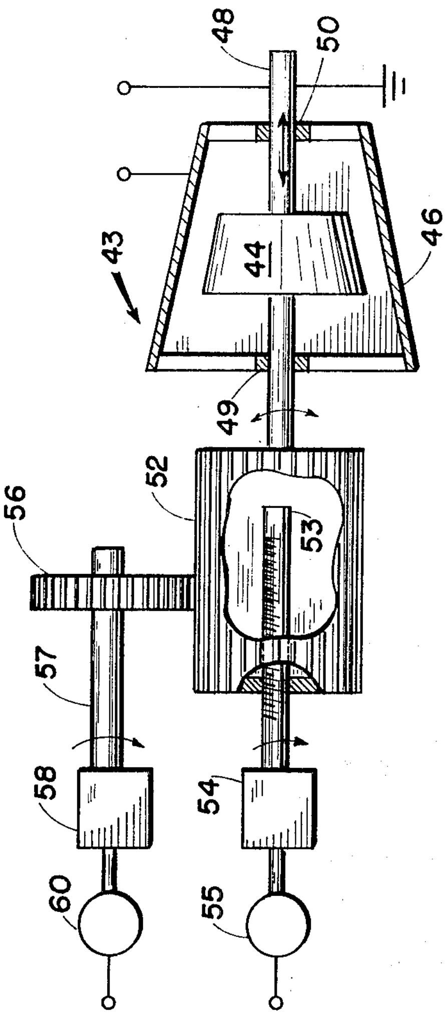
FIG. 4 is a detail side elevation, partly in section, showing the adjustable capacitor for the drift rate compensator.
Figure 5:
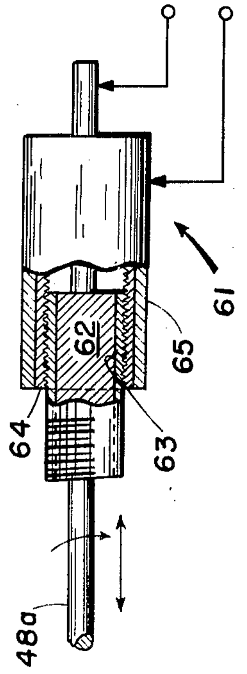
FIG. 5 is a detail section showing a modified tuning capacitor for the invention.
Figure 6:
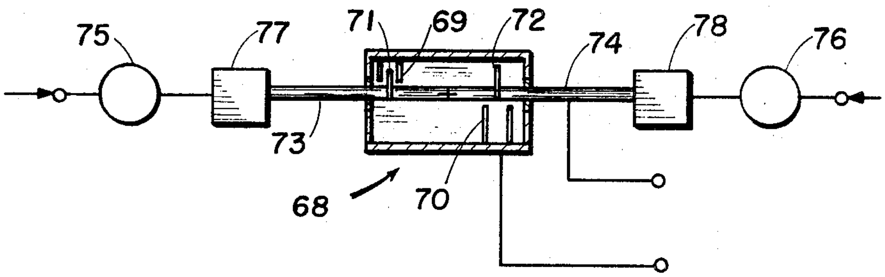
FIG. 6 is a diagrammatic view of another form of tuning capacitor.
Figure 7:
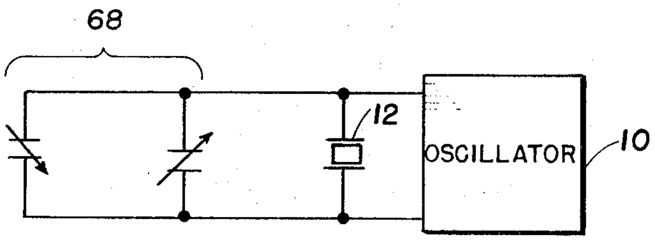
FIG. 7 is a schematic view showing the capacitor of FIG. 6 connected to the oscillator and crystal.

In FIGS. 4, 5 and 6 are shown schematically three capacitor design concepts. In the concept shown in FIG. 4, the capacitor, shown generally at 43, includes a frusto-conical rotor 44 which is mounted for axial movement within a stator 46 of similar contour by a shaft 48. The shaft 48 is insulated from the stator by bushings 49 and 50 and has a traveling spur gear 52 mounted on its inner end. The spur gear 52 has its inner end wall formed with a threaded axial opening to receive a lead screw 53 which is connected to the output side of a reduction gear assembly 54, the input side of said gear assembly being connected to a synchronous motor 55. Meshing with the traveling spur gear 52 is a pinion 56 which is mounted on a shaft 57 that is connected to the output side of a second reduction gear assembly 58. The input side of the second assembly 58 is connected to a second synchronous motor 60.

The motors 55 and 60 are, as shown in FIG. 3, connected to the frequency synthesizer 34 to provide differential movement of the capacitor rotor 44 with respect to the stator 46. That is, rotation of the lead screw 53 by the motor 55 will cause the spur gear to move axially toward the stator 46 for moving the rotor 44 nearer said stator and increasing the capacity of the capacitor 43. Rotation of the pinion 56 by the motor 60 will move the spur gear 52 in the opposite direction, on the lead screw 53, for moving the rotor 44 away from the stator 46 and decreasing the capacity of the capacitor.

In lieu of the capacitor 43 the capacitor 61, shown in FIG. 5, may be used. In this view a shaft corresponding to the shaft 48 is shown at 48a. The shaft 48a is adapted to be rotated in either direction to produce axial movement by apparatus similar to that shown in FIG. 4, i.e., a traveling spur gear, a pinion, and associated motors and reduction gear assemblies.

Mounted on the shaft is a cylindrical metal rotor 62 which has a threaded sleeve 63 of dielectric material fitted thereon. The sleeve 63 is threaded into a dielectric sleeve 64 which is fitted within a cylindrical metal stator 65. Movement of the rotor, by rotation of the shaft 48a, with respect to the stator 65 will, of course, change the capacity of the capacitor 61.

In the embodiment shown schematically in FIG. 6, a two section "butterfly" capacitor 68 is used. The capacitor 68 comprises stator sections 69 and 70 and rotor sections 71 and 72, the rotor sections including opposed shafts 73 and 74 which are differentially driven by motors 75 and 76, respectively, through reduction gear boxes 77 and 78.

A simple analysis was performed for two capacitor design concepts as a function of satellite life to determine the average value of the motor drive frequency difference, $\epsilon$, as a function of the number of poles in the synchronous motors and the speed reducer gear ratios.

In the differentially tuned system the absolute speed of motor rotation as determined by frequency of the motor excitation and the number of poles is important when estimating the quality of bearings and mechanical components for a specified life, and absolute speed may also have some effect on oscillator short term jitter due to cogging and other mechanical anomalies. In principle the system is independent of absolute speed; the actual tuning of the capacitors is proportioned to the differential speed of the motors.

By way of example, let it be supposed that one of the tuning arrangements shown in FIGS. 4, 5 or 6 is used to obtain a life of 5 years using six pole synchronous motors with $10^3$ speed reduction and an excitation frequency of 25 $H_z$. For the variable speed motors the average synthesized frequency $f_o$ + must be $25 + 3.8 \times 10^{-3}$ Hz for an accumulation of 200 turns rotation of the output shaft in 5 years. The required frequency synthesis expressed in parts is $$\frac{3.8 \times 10^{-3}}{25} = 1.5 \text{ parts in } 10^4$$

From this a frequency synthesizer for the variable speed motors can be constructed using pulse addition and digital countdown techniques. On the average 150 pulses would be added each second to a pulse waveform at $10^6$ pulses per second for countdown to the 25 $H_z$ level. Of course many other additions can be selected depending upon the digital component available.

In the event that system operation should require resetting of the tuned capacitor, rapid slewing is possible by merely de-energizing the appropriate motor for a short interval. This is a desirable characteristic from an operational point of view. However, for fail-safe operation and good reliability redundant electrical circuits would be desirable, as unilateral failures would permit the active motor to drive against the limits.

Figure 8:
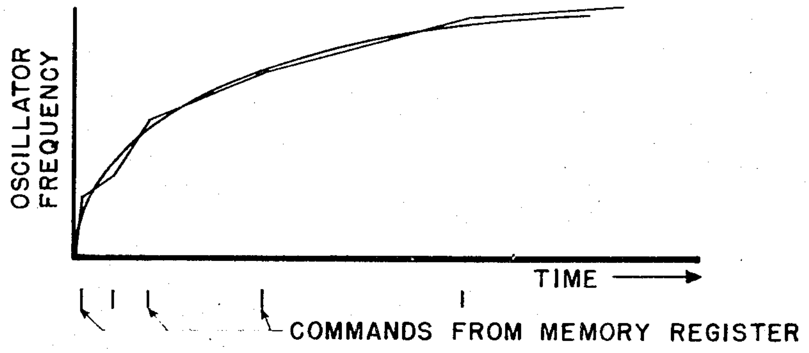
FIG. 8 is a chart showing compensation of the oscillator frequency in response to programmed delayed commands from a memory storage register during satellite orbits and between injection periods.

In the period of several days following the launching of a satellite, the oscillator will be adjusting to the space environment and its frequency of oscillation will be accelerating (or decelerating) so that rate compensation alone, based upon periodic input commands by direct telemetry at 12, 24, or 36 hour "injection" intervals, may not be sufficient for accurate navigation. Recovery from an encounter with abnormal radiation (nuclear blast) may also require higher order compensations. However, by storage of instructions in the satellite memory 28 during the "injection," delayed commands can be programmed for automatic readout at frequent intervals to change the magnitude and speed of capacitor tuning during the intervening orbits between injection commands, thereby obtaining a quasi-acceleration compensation, as shown in the chart of FIG. 8.

The facility for inflight delayed commands by way of the memory register 28 will appreciably reduce the time between launch and authorization to use a new satellite and can materially aid in recovery from operational problems (such as nuclear radiation).

In the block diagram of FIG. 3, it should be noted that the satellite carrier and phase modulation waveform are generated coherently from the reference oscillator. The frequency multiplier chain and the divider operate directly and only on a common signal input from the oscillator. The compensation provided by the tuned capacitor is common to the carrier and to the timing function of the phase modulation waveform.

By transmitting at the specified frequency (with the daily error reduced by the compensation method of the invention) and by synchronizing the transmitted timing (modulation) pulse to specific zero crossings of the carrier, an accurate time recovery system can be provided by navigators and other users. The high accuracy can be obtained at the user's receiver from zero crossing of the filtered carrier, while recovery of the modulation waveform resolves ambiguities. Thus both coarse and fine measurements of time can be made by remote users, based on the satellite oscillator frequency, which is compensated with reference to the frequency of the best available primary standard.

Summarizing, a basic concept for a compensated secondary frequency standard has been described with particular application in a navigation satellite. Continuous correction is provided for the long term rate of change of the frequency of an oscillator. It has been shown that rate compensation of a remote oscillator by telemetry is feasible and preferable to periodic stepwise frequency adjustments, and that by a combination of frequency synthesis of selectable motor drive voltages and by differential synchronous motor tuning of an oscillator tuning capacitor, practical components compatible with a reliable life of say, 5 years are obtainable. It has also been shown that by using a memory register on board the satellite, quasi-acceleration compensation can be obtained by timed readout of programmed commands, and that a compensated satellite oscillator permits coherent generation of timing modulation and carrier signals, and thereby makes possible a highly accurate time recovery system.

We claim:

1. In a drift rate compensator for a transmitting and receiving system having an oscillator and a crystal for controlling the frequency of the oscillator, a variable capacitor connected in parallel with the crystal and the oscillator, said variable capacitor including a stator, a shaft and a rotor mounted on the shaft, means operable for tuning the capacitor for increasing the capacity in parallel with the crystal, means operable for tuning the capacitor for decreasing the capacity in parallel with the crystal, constant speed motor means connected with said capacity increasing means and with said capacity decreasing means and operable for adjusting the capacitor to compensate for long term frequency drift of said oscillator, a first reduction gear connected to said constant speed motor means, a variable speed motor, a second reduction gear connected to said variable speed motor, means coupling the reduction gears to the variable capacitor, wherein said coupling means includes a traveling spur gear mounted on the shaft, means connecting the traveling spur gear to the first reduction gear, a pinion meshing with the traveling spur gear, and means connecting the pinion to the second reduction gear.

2. A drift rate compensator as recited in claim 1, wherein said variable capacitor stator and rotor are each frusto-conical, and wherein said shaft is rotatable and movable rectilinearly for moving the rotor toward or away from the stator.

* * * * *